Dec. 23, 1952     L. B. SCHROEDER     2,622,912
PIE DISPENSER
Filed Oct. 8, 1949
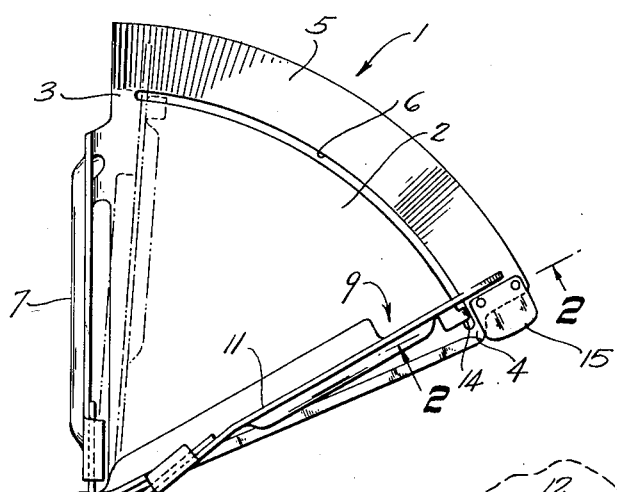
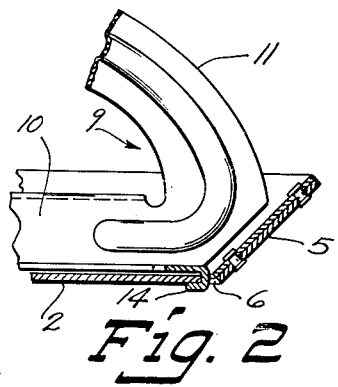
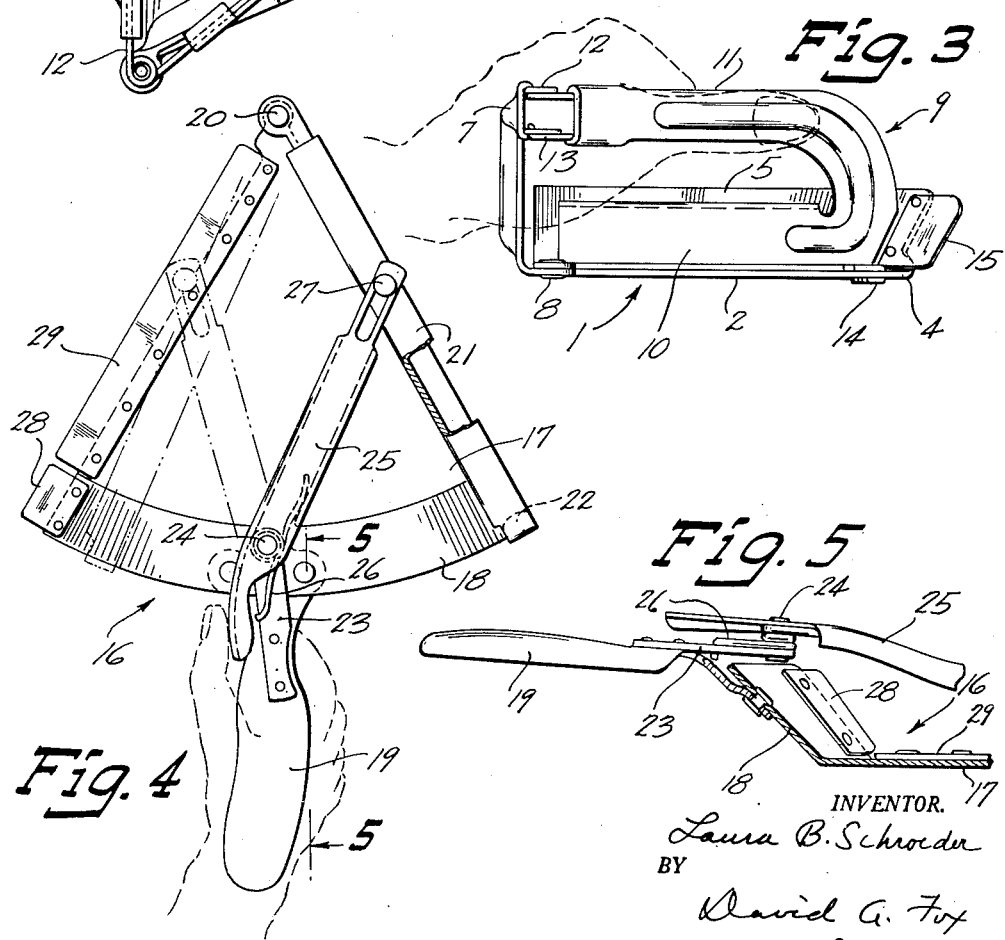
INVENTOR.
Laura B. Schroeder
BY David G. Fox
Attorney Patented Dec. 23, 1952

2,622,912

UNITED STATES PATENT OFFICE 2,622,912

PIE DISPENSER

Laura B. Schroeder, Milwaukee, Wis.

Application October 8, 1949, Serial No. 120,267

5 Claims. (Cl. 294—1)

This invention relates to serving implements and resides more particularly in an improved pastry server for serving pie and the like in which a segmental serving lifter, provided with hand grip, is arranged in cooperative relationship with an unloading member pivotally attached at the apex of the segmental lifter, the unloading member being associated with actuating means positioned to be operated by the user's hand while holding the hand grip.

One object of this invention is to provide a pie server which will quickly separate and lift a cut serving of pie from the container or pie tin in which the pie is held.

Another object of this invention is to provide a pie server which may be easily and naturally manipulated with but one hand, both to lift a serving and to unload the same thus facilitating the dispensing of pie servings.

The foregoing and other objects and advantages of this invention will appear from the description following which is set forth with reference made to the accompanying drawing forming a part hereof and in which there is shown by way of illustration and not of limitation specific forms in which the serving implement of this invention may be embodied.

In the drawing:

Fig. 1 is a top plan view of one form of the serving implement of this invention which employs an inwardly turned hand grip, Fig. 2 is a detailed fragmentary sectional view in elevation of a part of the implement shown in Fig. 1 viewed through the plane 2—2 there indicated, Fig. 3 is a front view in elevation of the implement shown in Fig. 1, Fig. 4 is a top plan view of another form of the implement of this invention employing an outwardly extending hand grip, and Fig. 5 is a detailed fragmentary side view in section and in elevation of the implement shown in Fig. 4 viewed through the plane 5—5 there indicated.

As shown in the drawing, the form of the implement of this invention depicted in Fig. 1 comprises a sector shaped serving lifter member designated generally by the numeral 1 which conforms roughly to the dimension and configuration of a single serving of pie. The lifter member 1 is made up of a sector shaped base 2 joined at 3 and 4 with a conical rim 5 which is separated from the base 2 throughout the main part of its circumferential extent by an arcuate slot 6 the purpose of which will presently be described. The lifter member is preferably formed of suitable sheet metal of sufficient stiffness to provide a rigid structure not easily deformed.

Formed integrally with the lifter member 1 extending upwardly from a point adjacent the rear end of the conical rim 5 is a hand grip 7 which extends above the sector shaped base 2 horizontally toward the apex thereof. Pivotally attached to the base 2 at the apex thereof by means of the rivet 8 is a swingable unloading member, generally designated by the numeral 9, having an unloading blade portion 10 and an actuating arm 11. The actuating arm 11 conforms roughly to the configuration of the horizontal run of the hand grip 7 and terminates at a point adjacent the end of the hand grip 7 close to the axis of pivot 8. The adjacent ends of the hand grip 7 and the actuating member 11 are joined by means of coil springs 12 and 13 positioned as shown to flex about the axis of pivot 8.

Springs 12 and 13 are tensioned to maintain the unloading member 9 normally in the position shown in full lines in Fig. 1, and by yielding to permit the loading member 9 to be swung about the pivot 8 to the position shown in broken lines in Fig. 1. As indicated in broken line outline in Fig. 3, this permits the operator to grasp the handle 7 with the finger portion of the hand and to engage the actuating member 11 with the thumb portion of the hand, or vice versa, depending upon which hand is employed. By applying and releasing a squeezing force the operator thus may retract or advance the unloading blade 10 at will while maintaining a grip upon the implement.

In order to prevent undue stress at the pivot 8, the unloading member 9 is provided with a lug 14 which extends through the slot 6 and which is bent backwardly beneath the base 2 so as to slidingly engage the periphery thereof. The conical rim 5 of the lifter member 1 being joined with the base 2 by the relatively narrow sections 3 and 4 may be bent easily to accommodate pie tins having rims of varying inclinations. As an aid to the separation of the crust from the tin the rim 5 terminates as shown in a spatula-like tongue 15 which can flex as it engages irregularities commonly encountered in the rim portions of pie tins.

In use, the apparatus shown in Figs. 1 to 3, is grasped by the operator. The unloading member 9 is retracted and the implement is normally placed, after removal of the first piece, in a free space adjacent a radially extending margin of a cut serving of pie. The tongue 15 and the leading or cutting edge of the base 2 that is in radial alignment with the edge of tongue 15 are rested upon the pie tin. The server is then moved circumferentially about the apex of the dispenser to separate the crust from the tin and to insert the dispenser beneath the serving of pie. If the first piece is to be removed the leading or cutting edges of the server are forced downwardly into a radial cut and the server is then turned with a scooping circumferential motion to bring it beneath the serving. The serving of pie is then lifted to a position above a serving plate and the unloading member 9 is permitted to advance under the influence of springs 12 and 13 which causes the serving of pie to be transferred to the plate. In this operation the operator's other hand is free at all times permitting its use in holding the pie tin or the plate which greatly facilitates the operation of serving.

In the form of apparatus shown in Figs. 4 and 5 a segmental lifter member 16 having a base 17 and rim 18 is provided. The working edges of both the rim 18 and base 17 are nosed with thin spring stock as at 28 and 29 respectively to assist in separating the crust of a pie from the adjacent surfaces of a pie tin. Secured to the rim 18 is an outwardly extending handle 19 intended to be engaged by the hand of the operator as shown in Fig. 4.

Pivotally secured to the apex of the lifter member 16 by means of the pivot 20 is an unloading member 21 which has a bent back ear 22 in sliding engagement with the periphery of the rim 18.

Projecting inwardly from the handle 19 is a mounting bracket 23 which serves as a support for a pivot 24 upon which an actuating lever 25 is pivotally carried. The outer end of lever 25 is slotted so as to engage a pin 27 secured to the unloading member 21. Spring 26 interposed between bracket 23 and lever 25 acts to urge the lever 25 normally to the position shown in Fig. 4, and thus to maintain the unloading member 21 normally in the position there shown.

Upon grasping the implement as shown in Fig. 4, an operator by pressure of the thumb may move the lever 25 and member 21 to the position shown in broken lines. Upon release of thumb pressure the parts return to normal position. In this way it may be observed an operator may lift and discharge a serving of pie in a manner similar to that described in connection with the apparatus illustrated in Figs. 1 to 3.

I claim:

1. In a serving implement the combination comprising a flat sector shaped lifting member having two radial boundaries and an arcuate boundary with a raised rim along its arcuate boundary; an unloading member pivotally attached to said lifting member at the apex thereof; said unloading member being adapted to swing over the surface of said lifting member within said raised rim; a handle attached to said lifting member; an actuator for said unloading member cooperatively engaging the same to impart swinging motion thereto; and a returning spring interposed between said actuator and said handle, tensioned to urge said actuator and unloading member toward a position adjacent one of the radial margins of said lifting member and yieldable to permit said unloading member and actuator to be moved to a position adjacent the opposite radial boundary of said lifting member.

2. In a serving implement the combination comprising a flat sector shaped lifting member having two radial boundaries and an arcuate boundary with a raised rim along its arcuate boundary, an unloading member pivotally attached at its inner end to said lifting member at the apex thereof, said unloading member being adapted to swing over the surface of said lifting member within said raised rim, a handle attached to said lifting member near the outer end of one of the radial boundaries thereof extending above said boundary toward the apex of said lifting member, an actuator for said unloading member secured thereto near the outer end thereof and extending above the same toward the inner end thereof, and a spring interposed between the inner end of said actuator and the inner end of said handle centered above said pivot and tensioned to urge said actuator and unloading member toward a position adjacent the radial margin of said lifting member which is opposite said handle said spring being yieldable to permit said unloading member and actuator to be moved to a position adjacent the handle.

3. In a serving implement the combination comprising a sector shaped lifting member having a raised rim along its arcuate boundary, an unloading member pivotally attached to said lifting member at the apex thereof, an outwardly extending handle attached to the arcuate boundary of said lifting member, an actuator lever pivotally attached near the inner end of said handle and having a thumb engaging end adjacent said handle and an operating end co-operatively engaging the unloading member, and a returning spring engaging said actuator lever tensioned to urge said actuator lever and unloading member toward a position adjacent one of the radial margins of said lifting member, said spring being yieldable to permit said unloading member and actuator to be moved to a position adjacent the opposite radial boundary of said lifting member.

4. In a serving implement the combination comprising a sector shaped lifting member having a raised rim along its arcuate boundary, an unloading member pivotally attached at its inner end to said lifting member at the apex thereof, an arcuate guide on said lifting member slidingly engaging the outer end of said unloading member, a handle attached to said lifting member, an actuator for said unloading member co-operatively engaging the same, and a returning spring interposed between said actuator and said handle tensioned to urge said actuator and unloading member toward a position adjacent one of the radial margins of said lifting member yieldable to permit said unloading member and actuator to be moved to a position adjacent the opposite radial boundary of said lifting member.

5. In a serving implement the combination comprising a sector shaped lifting member having two radial boundaries and an arcuate boundary with a raised rim along its arcuate boundary, a flexible cutting edge for said lifter member ranged along one of the radial boundaries thereof, an unloading member pivotally attached to said lifting member at the apex thereof, a handle attached to said lifting member, an actuator for said unloading member co-operatively engaging the same, and a returning spring interposed between said actuator and said handle tensioned to urge said actuator and unloading member toward a position adjacent one of the radial margins of said lifting member yieldable to permit said unloading member and actuator to be moved to a position adjacent the opposite radial boundary of said lifting member.

LAURA B. SCHROEDER.

REFERENCES CITED

The following references are of record in the file of this patent:

UNITED STATES PATENTS

| Number | Name | Date |
|---|---|---|
| 1,135,906 | Ludwig | Apr. 13, 1915 |
| 2,303,116 | Engle | Nov. 24, 1942 |
| 2,496,908 | Doux | Feb. 7, 1950 |